I. H. JEWELL.
METHOD OF FILTRATION.
APPLICATION FILED FEB. 4, 1907.
903,385.
Patented Nov. 10, 1908.
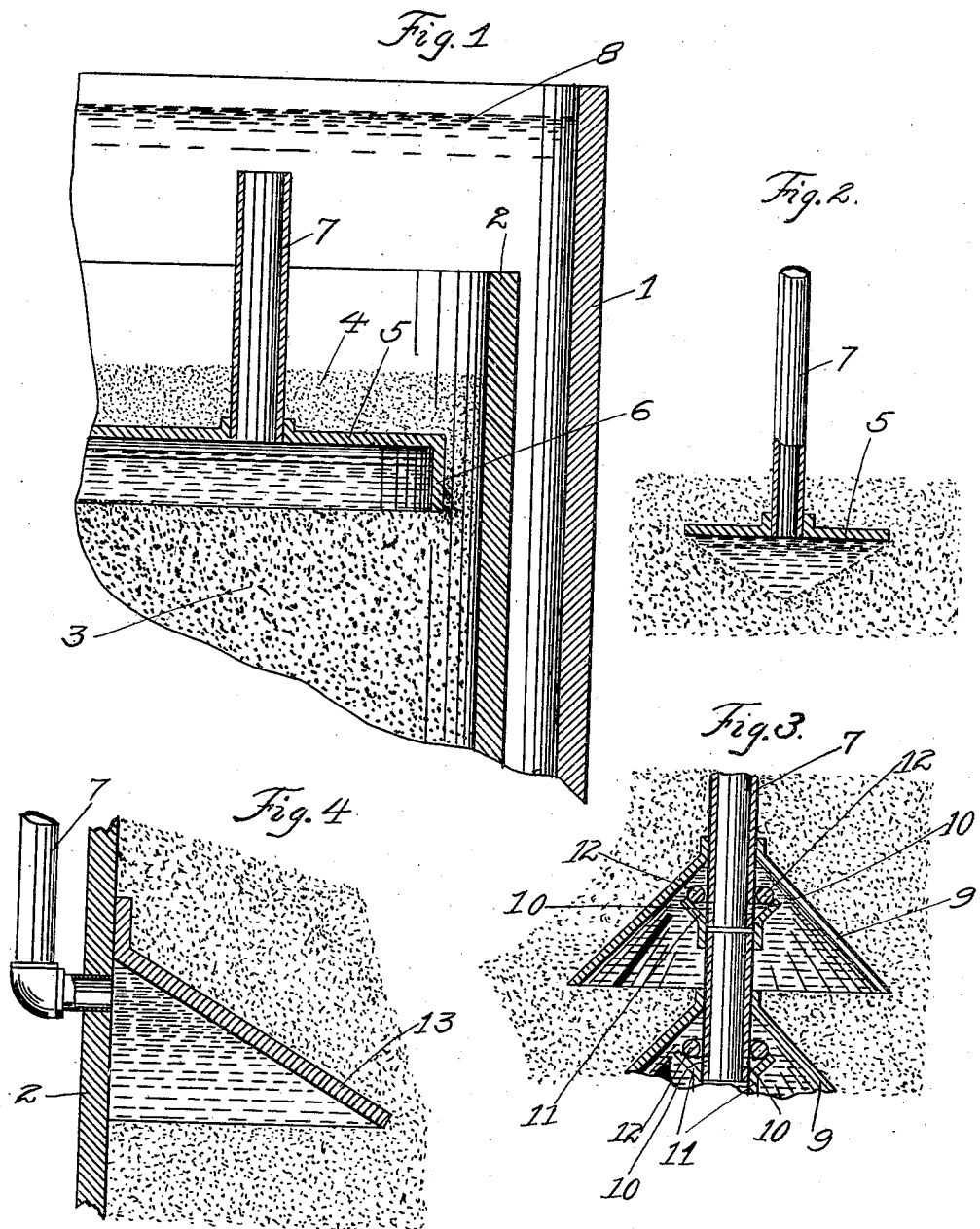
WITNESSES:
Charles I. Cobb
C. E. Jordan
INVENTOR.
Ira H. Jewell
BY
Hill & Hill
ATTORNEYS.

UNITED STATES PATENT OFFICE.

IRA H. JEWELL, OF CHICAGO, ILLINOIS.

METHOD OF FILTRATION.

No. 903,385.

Specification of Letters Patent.

Patented Nov. 10, 1908.

Application filed February 4, 1907. Serial No. 355,550.

*To all whom it may concern:*

Be it known that I, IRA H. JEWELL, a citizen of the United States, residing at Chicago, in the county of Cook and State of Illinois, have invented a certain new and useful Method of Filtration, of which the following is a description.

My invention belongs to that particular method of filtration in which the fluid is caused to percolate through a granular bed, the filtered fluid being conducted therefrom in any suitable way, and in which means are provided for cleansing the granular bed by a current of liquid driven by pressure in a substantially reverse direction.

The object of my invention is to increase the effectiveness of filters of this description. To this end my invention consists in the novel method herein described and more particularly pointed out in the claim.

In the drawings, wherein like reference characters indicate like or corresponding parts,—Figure 1 is a fragmentary sectional view of a well known form of filter, illustrating one means for carrying my method into operation; Fig. 2 is a sectional view showing a modification; Fig. 3 is also a sectional view showing a further modification; Fig. 4 is a partial sectional view of a form adapted for either vertical or horizontal filtration.

In filters in which a granular bed is employed, which is washed by a reverse current, it is found in practical use that the washing operation carries the finer particles of the bed to the top thereof, where they are deposited by the subsidence of the fluid after the washing operation. Continued use of the granular material also tends to reduce the size of the particles of granular material, so that as a result there is formed upon the top of the bed a layer of very fine material which extends in depth from a quarter of an inch to an inch or more, while below that the granular material is coarser and more porous. The fine layer upon the top of the bed tends to retard the filtering operation, and also tends to become clogged in a comparatively short time, depending upon the quality of the liquid treated. This is particularly true where a coagulant is used in connection with the filtering operation.

The object of my present invention is to overcome the difficulties referred to by forming intercellular spaces in the body of the filter bed, and arranging to conduct a portion of the fluid to said spaces. These spaces being positioned below the fine layer upon the top or bed, aid materially in the rapid filtration of the fluid, without in any way interfering with the operation of the fine layer upon the top of the bed in the ordinary manner.

As shown in Fig. 1, 1 is an outer tank having positioned therein an inner tank 2 spaced from the outer tank, the two being provided with the usual connections to conduct fluid to and direct the same away from the apparatus (not shown). 3 represents the main body of the granular bed having upon its top a layer 4 of finer material, which is caused to settle upon the top of the bed by the washing operation referred to. At one or more points in the body of the bed, and below the fine top layer, I arrange a horizontal plate 5 provided with downwardly extending margins 6, and with a central pipe 7 connecting therewith. The fluid is indicated in the drawing during the filtering operation, as at 8. Gravity will cause the fluid to percolate through the bed, and a portion of it will pass through the tube 7 to the space formed below the plate 5. This space will be filled with liquid, as indicated, and, by reason of the weight of the column of water, and the action of gravity, will also percolate through the bed, and aid materially in the rapid operation of the device. The liquid will percolate through the fine layer above the plate 5, and will naturally find its way about the edges of the plate, and thus on to the outlet.

During the washing operation when reverse current is employed, the bed is agitated by the current, and the fluid passing over the top of the tank 2 will pass down in the annular space between the two tanks and escape by an outlet (not shown).

It is to be observed that the tube 7 should always be of sufficient height so that the weight of the contained column of fluid shall not be less than the pressure of the reverse current. By this means the two pressures will be counterbalanced to such an extent that the granular bed will not enter the tube, and thus tend to clog the same. As shown, in Fig. 1, the tube 7 extends above the top of the tank 2, and thus the weight of the contained column of water will probably be slightly greater than the pressure of the reverse current. It is obvious that these plates may be situated throughout the bed, as desired, any preferred number of them being employed. It is also obvious that by this means a bed of greater depth may be employed, thus materially increasing the results of the operation of the device.

As shown in Fig. 2, the plate 5 is not provided with the downwardly depending marginal flanges 6, and the space below the plate is thus of slightly different form, it being the natural contour of the sand below a plain horizontal disk or plate. The tube 7 is employed in the same manner as before. In all cases it is of such height that the weight of the contained column of fluid shall not be less than the pressure of the reverse current employed in washing.

As shown in Fig. 3, the tube 7 is shown with a plurality of conical hoods 9 supported on the tube, with apertures 10 formed beneath the hoods to admit of the passage of the fluid. One or more such tubes may be positioned in the granular bed as desired, and the water entering by the tube readily escapes through the apertures 10 into the space below the hood, and thence percolates through the bed, as before described. In this form of the device I prefer to employ some suitable form of valve to prevent the entrance of the material of the bed into the pipe. As shown, an outwardly flaring ring 11 supported on the tube in proximity to the apertures 10 and the valve ring 12, loosely rests thereon. This construction permits the fluid to escape outward from the tube into the space beneath the hood, but when the reverse current is employed to wash the bed the valve closes and prevents the entrance of any of the granular bed to the tube, and at the same time prevents any current beneath the hood, which might cause the gathering of sufficient quantity of granular material to interfere with the operation of the device.

As shown in Fig. 4, a space is formed at the side of the tank by means of a hood 13, which preferably extends around the interior of the tank 2, thus forming an annular space. The tube 7 extends through the wall of the tank 2 to connect with the space. This form is particularly adapted for either vertical or horizontal filtration, the operation being substantially as before described in vertical filtration, while in horizontal filtration fluid may percolate through the bed to a central core or cores, not shown, in the well known manner.

It is obvious that the cellular spaces referred to may be located in such number and at such points in the bed as desired, or that two or more of the forms shown may be combined to secure the desired results. As before remarked, with the method herein described, a bed of much greater depth and capacity may be employed, thus greatly increasing the rate of filtration, without materially increasing the cost.

What I claim as new and desire to secure by Letters-Patent is:—

A method of filtering liquids which consists of passing a portion of the liquid through a granular bed and in introducing another portion of the liquid directly to an interior portion of said bed and filtering it through only a portion of said bed.

In testimony whereof, I have hereunto signed my name in the presence of two subscribing witnesses.

IRA H. JEWELL.

Witnesses:
Roy W. Hill,
Charles I. Cobb.